(12) United States Patent
Khami et al.

(10) Patent No.: US 9,278,475 B1
(45) Date of Patent: Mar. 8, 2016

(54) ENGINE AIR INTAKE DUCT WITH MOLDED-IN HYDROCARBON VAPOR TRAP

(71) Applicant: Ford Global Technologies, LLC, Dearborn, MI (US)

(72) Inventors: Roger Khami, Troy, MI (US); Jacqueline L. Tomlin, Southfield, MI (US); David S. Moyer, Sterling Heights, MI (US); Timothy Dorweiler, Farmington Hills, MI (US); James William Ortman, Saline, MI (US); Ha To Chung, Canton, MI (US); Jeffrey Pittel, Rochester, MI (US); Alexander King, Goodrich, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/471,172

(22) Filed: Aug. 28, 2014

(51) Int. Cl.
| | |
|---|---|
| *B01D 53/02* | (2006.01) |
| *B29C 49/20* | (2006.01) |
| *B29C 49/02* | (2006.01) |
| *F02M 35/02* | (2006.01) |
| *B29K 105/00* | (2006.01) |
| *B29K 633/04* | (2006.01) |
| *B29K 707/04* | (2006.01) |
| *B29L 31/14* | (2006.01) |
| *B29L 23/00* | (2006.01) |

(52) U.S. Cl.
CPC ............... *B29C 49/20* (2013.01); *B01D 53/02* (2013.01); *B29C 49/02* (2013.01); *F02M 35/0218* (2013.01); *B01D 2257/702* (2013.01); *B29C 2049/2008* (2013.01); *B29C 2049/2086* (2013.01); *B29K 2105/258* (2013.01); *B29K 2633/04* (2013.01); *B29K 2707/04* (2013.01); *B29L 2023/22* (2013.01); *B29L 2031/14* (2013.01)

(58) Field of Classification Search
CPC .................. B01D 2253/102; B01D 2253/104; B01D 2253/108; B01D 2253/1124; B01D 2253/206; B01D 2253/304; B01D 2253/306; B01D 2257/2045; B01D 2257/304; B01D 2257/406; B01D 2257/702; B01D 2257/708; B01D 2258/01; B01D 2258/0216; B01D 2258/0225; B01D 2259/4508; B01D 2259/4516; B01D 2259/4566; B01D 53/02; B01D 53/0415; Y10S 55/05
See application file for complete search history.

(56) References Cited

U.S. PATENT DOCUMENTS

| | | | |
|---|---|---|---|
| 6,733,705 B1 * | 5/2004 | Obara ........................ | 264/45.3 |
| 6,997,977 B2 | 2/2006 | Dallas et al. | |
| 7,344,586 B2 | 3/2008 | Zulauf et al. | |
| 7,641,720 B2 | 1/2010 | Li | |
| 7,918,912 B2 | 4/2011 | Tomlin et al. | |
| 8,191,535 B2 | 6/2012 | Bellis et al. | |
| 8,191,539 B2 | 6/2012 | Bellis | |
| 8,323,556 B2 | 12/2012 | Khami et al. | |
| 8,327,975 B2 | 12/2012 | Ortman et al. | |
| 8,617,454 B2 | 12/2013 | Khami et al. | |
| 2004/0211320 A1 * | 10/2004 | Cain .............................. | 96/108 |
| 2005/0005770 A1 * | 1/2005 | Dallas et al. .................... | 96/108 |

(Continued)

*Primary Examiner* — Christopher P Jones
(74) *Attorney, Agent, or Firm* — Greg P. Brown; Brooks Kushman P.C.

(57) ABSTRACT

An engine intake duct is formed by securing a hydrocarbon-adsorbing element to a frame to form an insert, positioning the insert in registry with a blow-molding core, placing a molten plastic parison and mold around the insert and core, and blow-molding the parison to form a shell engaging the frame to retain the insert with a surface of the insert exposed to a hollow interior of the shell.

7 Claims, 7 Drawing Sheets

(56) References Cited

U.S. PATENT DOCUMENTS

| | | |
|---|---|---|
| 2006/0096458 A1* | 5/2006 | Abdolhosseini et al. ....... 96/134 |
| 2008/0028938 A1* | 2/2008 | Li .................................. 96/134 |
| 2009/0293832 A1* | 12/2009 | Matsumoto et al. ..... 123/184.61 |
| 2011/0074067 A1* | 3/2011 | Khami et al. ................. 264/513 |
| 2012/0252343 A1* | 10/2012 | Kimura et al. ................ 454/143 |
| 2013/0291839 A1 | 11/2013 | Lin et al. |
| 2014/0109878 A1 | 4/2014 | Bellis et al. |

\* cited by examiner

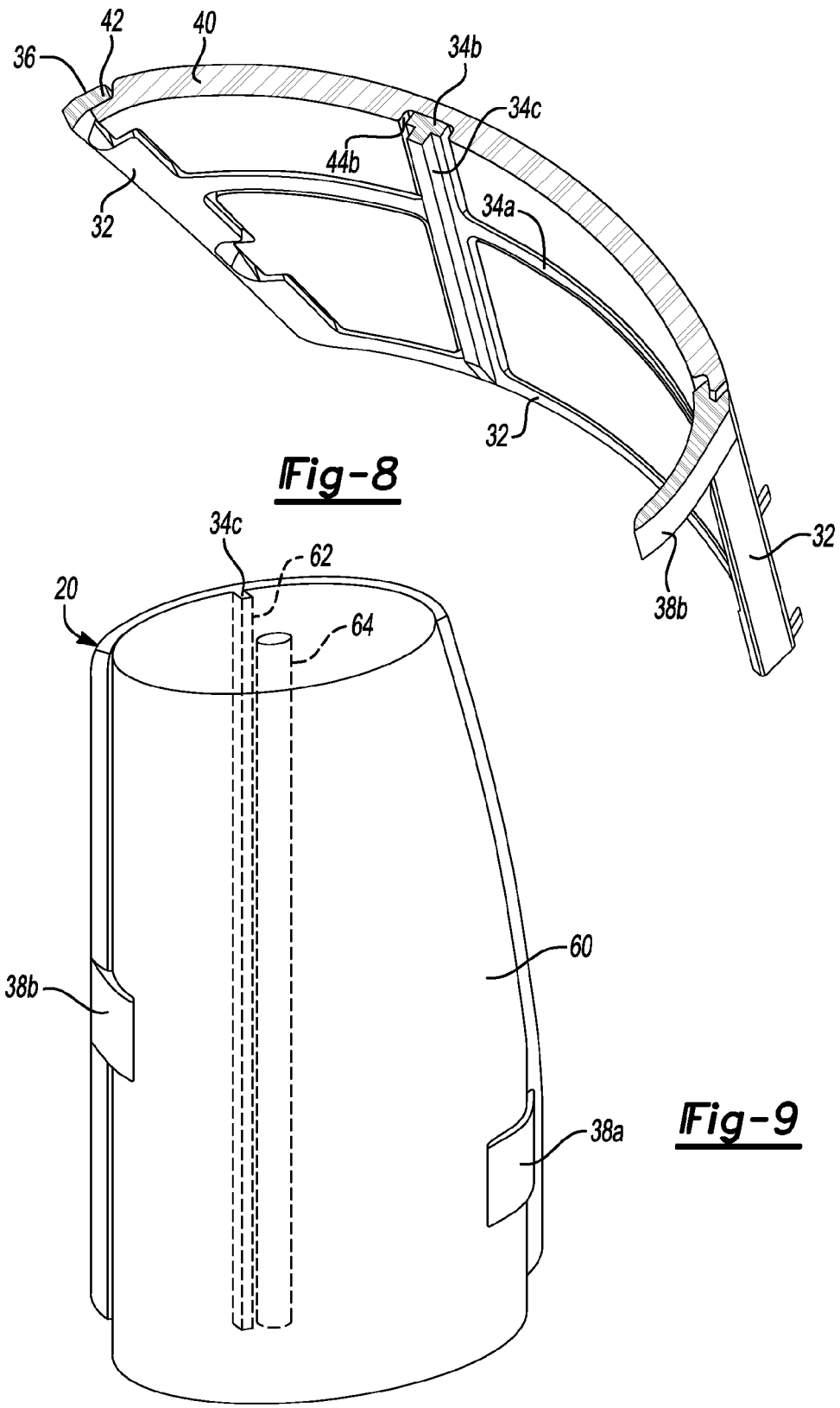

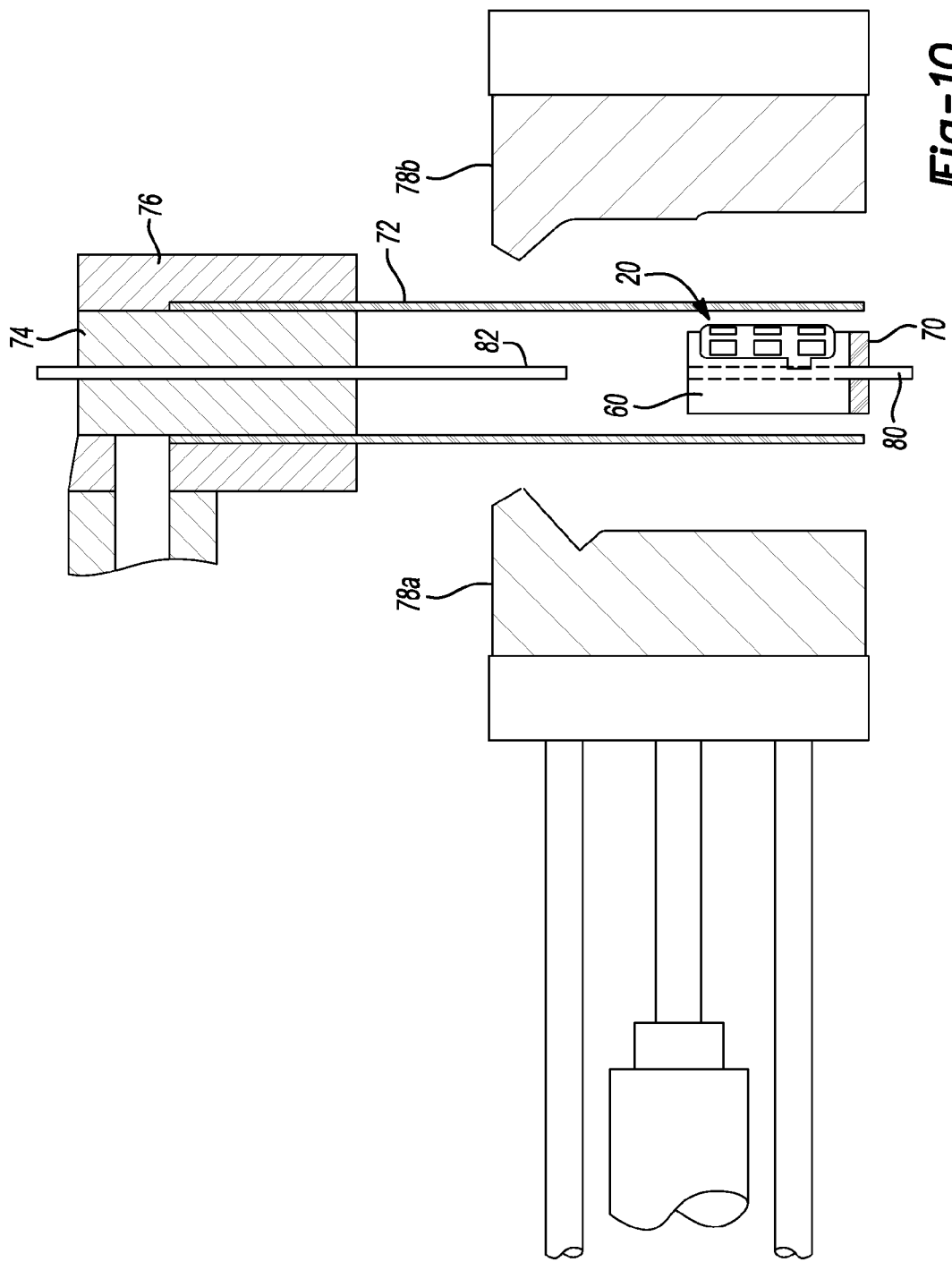

ENGINE AIR INTAKE DUCT WITH MOLDED-IN HYDROCARBON VAPOR TRAP

TECHNICAL FIELD

The present disclosure relates to an intake duct for an internal combustion engine and to a method for molding such a duct to include a hydrocarbon vapor trap.

BACKGROUND

Hydrocarbon (HC) vapor traps are used in the air induction path of internal combustion engines to capture hydrocarbon vapors emanating from within the engine, fuel system, pollution control system, and/or related components, and which would otherwise escape into the environment. The HC vapor trap is therefore part of a vehicle's pollution control system, reducing potentially undesired evaporative fuel emissions.

A HC vapor trap includes, as its operative component, an element that adsorbs HC vapors present in an air intake duct and which contact the element. It is known to form an HC-adsorbing element from one or more sheets of paper or polymeric material impregnated with a HC vapor adsorption/desorption material, such as activated carbon. The HC-adsorbing element is located in the engine intake duct to adsorb HC vapors that may be present when the engine is shut down. The HC vapors are then desorbed from the element into the intake airflow when the engine is re-started and fresh air is drawn into the air induction system. The desorbed vapors are carried into the engine along with the air charge and burned.

Numerous methods and structures have been proposed to position a HC trap within/along an engine's air induction path. In a typical installation, a HC trap is located downstream from an air filter box and upstream from an intake plenum and/or intake runners feeding into the cylinders of the engine.

U.S. Pat. No. 8,191,535, owned by the owner of this Application and the disclosure of which is incorporated herein by reference, discloses a HC vapor trap comprising a tubular HC-adsorbing sleeve surrounding a plastic cage. During assembly of the duct, the cage is inserted into the hollow interior of a first duct component through an open end thereof. A second duct component is fastened to the open end of the first component to enclose the trap unit and secure it in its desired installed position.

SUMMARY

In an embodiment disclosed herein, an engine intake duct comprises a hydrocarbon-adsorbing element secured to a frame to form an insert, and a plastic shell surrounding the insert and engaging the frame to retain the insert with a surface of the insert exposed to a hollow interior of the shell. The shell is formed by positioning the insert in registry with a blow-molding core, placing a molten plastic parison and mold around the insert and core, and blow-molding the parison to form the shell.

The HC-adsorbing element may be formed by thermoforming at least one sheet of polymeric material, at least a portion of the sheet impregnated with a HC vapor adsorption/desorption material. The HC-adsorbing element may have a depression formed in a surface thereof during the thermoforming, such that the element is secured to the frame by engagement between a tab projecting from the frame and the depression.

In another embodiment disclosed herein, a method of manufacturing an engine intake duct comprises securing a hydrocarbon-adsorbing element to a frame to form an insert, positioning the insert in registry with a blow-molding core, placing a molten plastic parison and mold around the insert and core, and blow-molding the parison to form a shell engaging the frame to retain the insert with a surface of the insert exposed to a hollow interior of the shell.

In another embodiment, the frame comprises at least one positioning feature and the step of placing the insert in contact with the core comprises placing the positioning feature in engagement with a complementary feature of the core.

BRIEF DESCRIPTION OF THE DRAWINGS

FIG. 8 is a cross-sectional view taken along line 8-8 of FIG. 6;

FIG. 9 is a schematic perspective view of the insert of FIGS. 5-8 in registry with a core as used in a blow molding process;

FIG. 10 is a schematic view of a blow molding apparatus used in the molding of an intake duct of the type shown in FIGS. 1-5.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
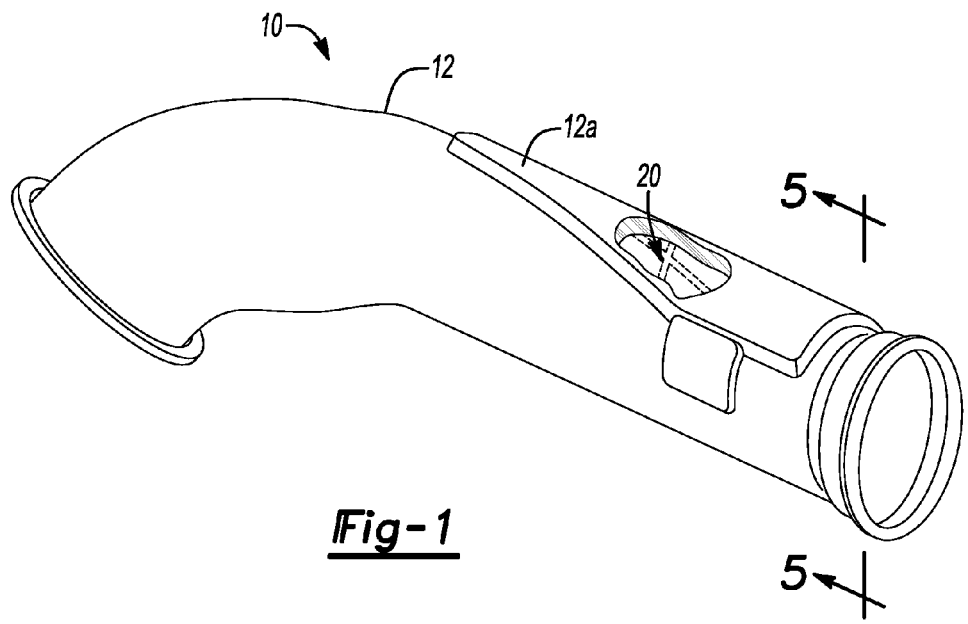
FIG. 1 is a perspective view of an engine air intake duct with a molded-in-place hydrocarbon-adsorbing insert.
Figure 2:
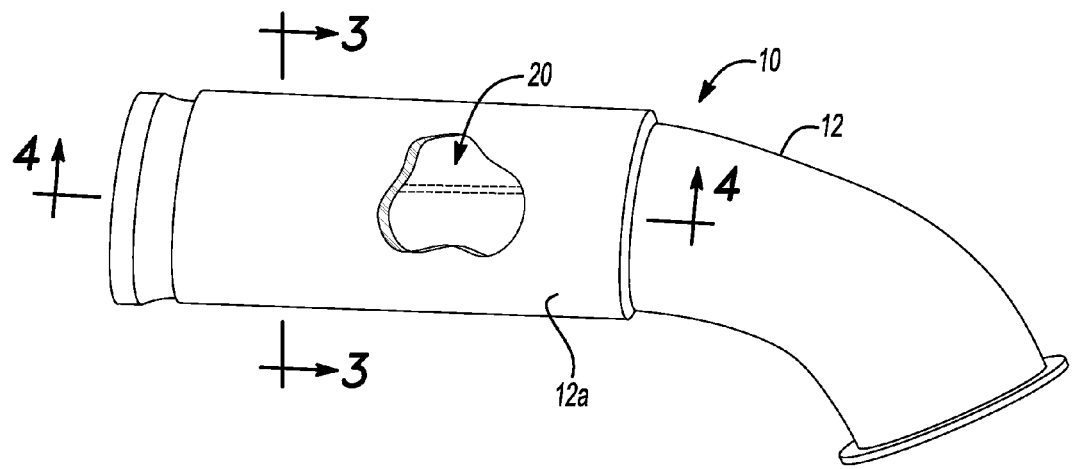
FIG. 2 is a perspective view of the intake duct of FIG. 1 from a different angle.

FIGS. 1 and 2 are simplified views of an air intake duct 10 such as may be used in an air induction system of an internal combustion engine (not shown). As is well known in the art, intake duct 10 is designed and intended to be located at an appropriate point upstream of the engine. For example, duct 10 may extend between an air cleaner box (not shown) and an intake plenum and/or throttle body (not shown). The upstream and downstream ends of duct 10 may be connected with the adjoining portions of the air induction system by any means known in the art. Duct 10 is shown to have a generally oval cross section and include an approximately 45° bend, but this geometry is exemplary in nature only. The exact dimensions and shape of the duct depends upon many variables and is mainly dictated by the available package space within the engine compartment.

Intake duct 10 comprises a one-piece, tubular shell 12 that is formed of a plastic material by an appropriate process, such as blow-molding. The particular type and formulation of plastic used to form the shell 12 is, as will be apparent to a person skilled in the art, determined by various factors such as the particular molding process used and the required mechanical characteristics of the finished product. A hydrocarbon (HC) trap insert 20 is housed within shell 12, the shell being molded around the HC trap insert such that the portion of shell overlying the HC trap insert forms an outward bulge 12a relative to the immediately-adjacent portions of the shell.

Figure 3:
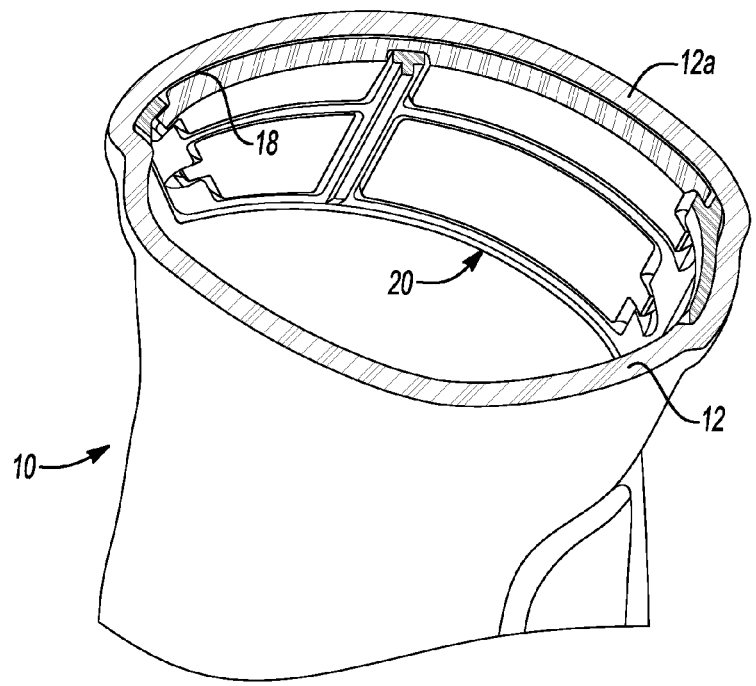
FIG. 3 is a cross-sectional view taken along line 3-3 of FIG. 2.
Figure 4:
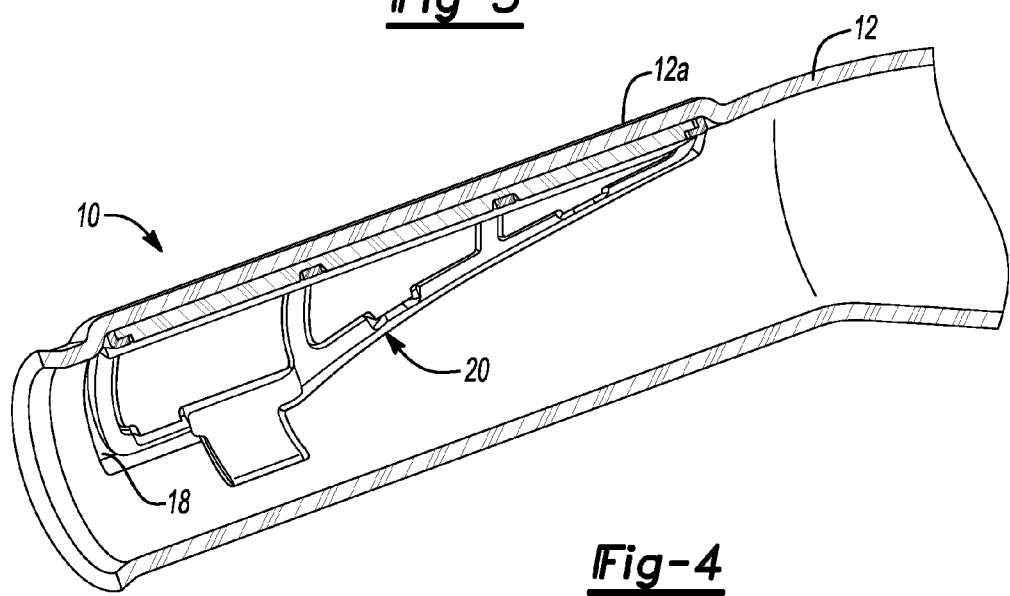
FIG. 4 is a cross-sectional view taken along line 4-4 of FIG. 2.
Figure 5:
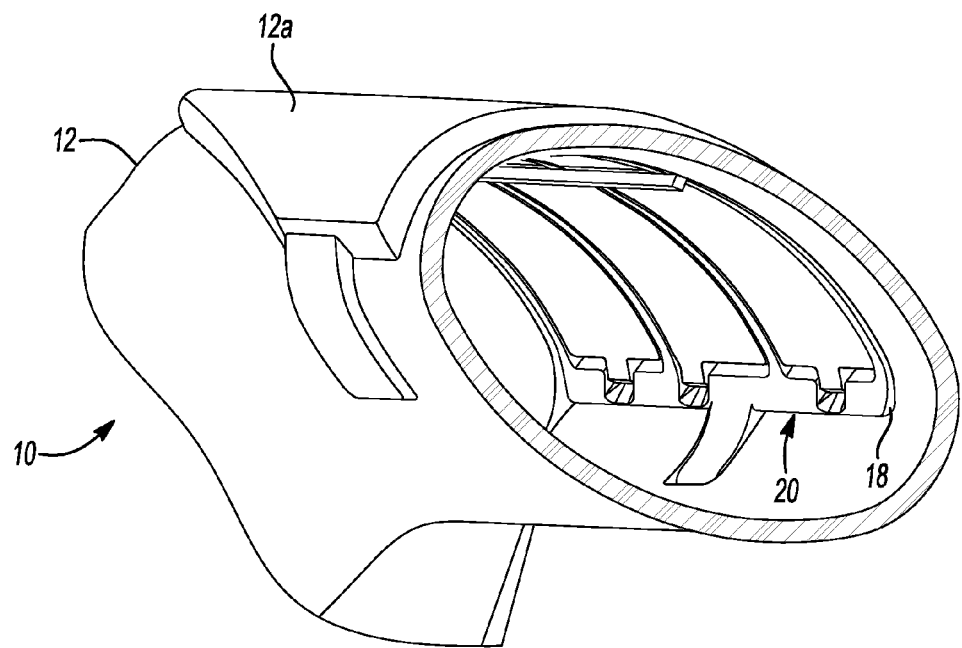
FIG. 5 is a cross-sectional view taken along line 5-5 of FIG. 1.

As best seen in FIGS. 3-5, HC trap insert 20 fits within a receptacle 18 recessed relative to the interior surface of shell 12, the receptacle corresponding to and formed by outward bulge 12a. HC trap insert 20 is preferably fully seated into receptacle 20 so that the insert does not project (or projects only minimally) into the interior of duct 10 thereby causing little or no restriction to airflow through the duct. The inner surface of HC trap insert 20 is exposed to the hollow interior of the duct 10.

Figure 6:
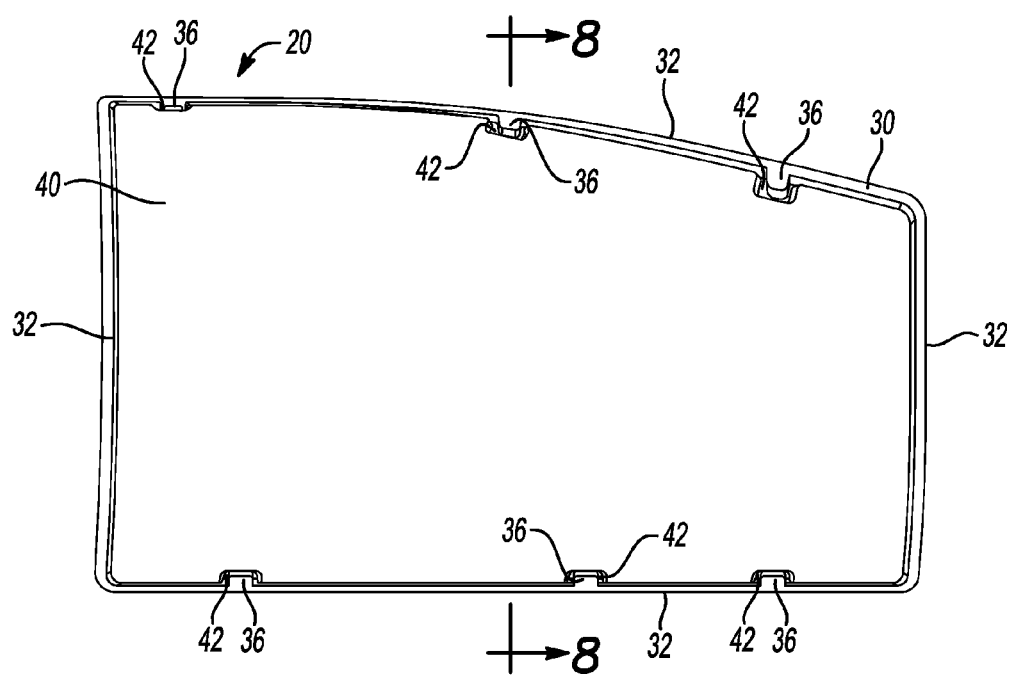
FIG. 6 is an plan view of a hydrocarbon trap insert.
Figure 7:
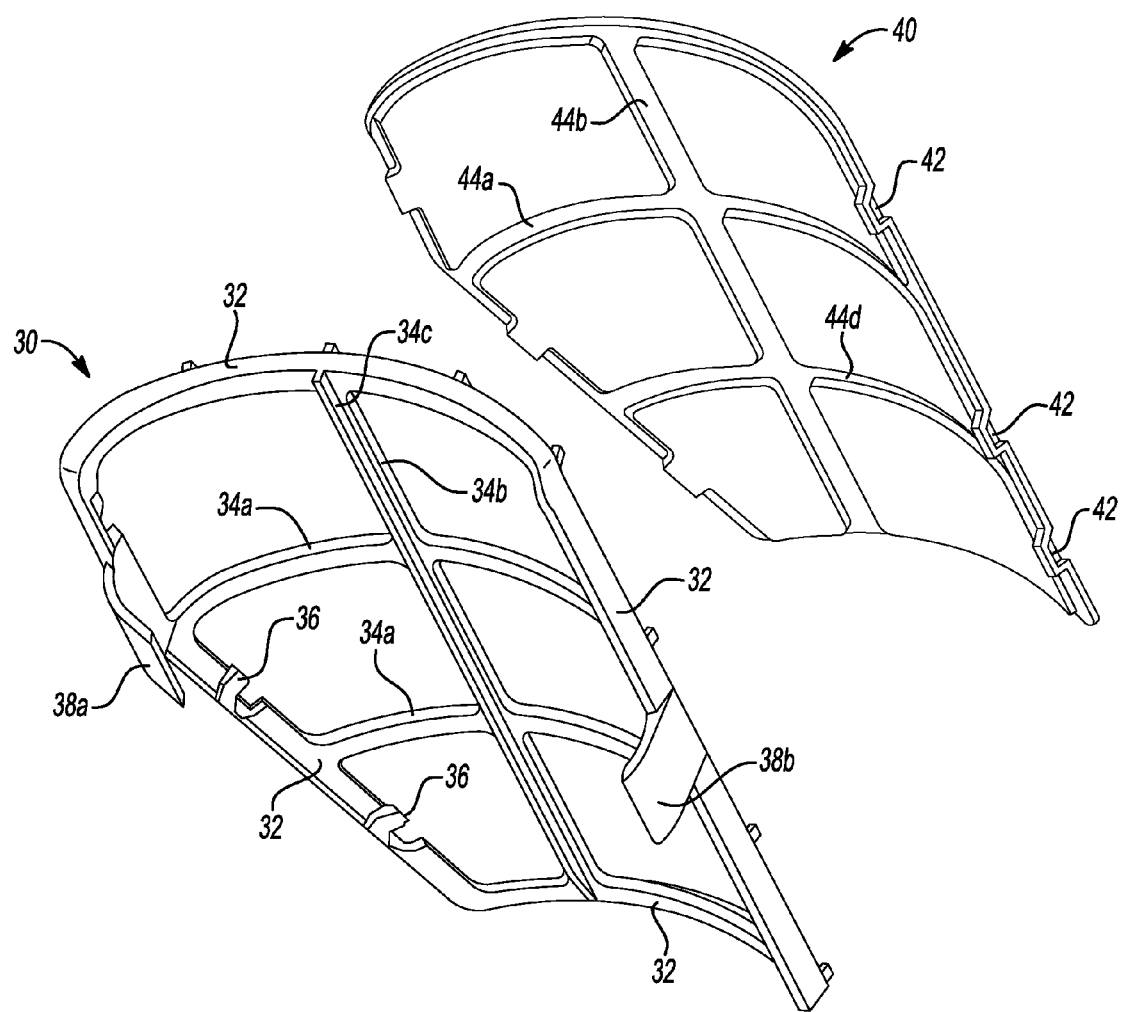
FIG. 7 is an exploded perspective view of the insert of FIG. 6.

As best seen in FIGS. 6-8, HC trap insert 20 comprises a frame 30 and a hydrocarbon-adsorbing (HCA) element 40 retained and supported by the frame.

Frame 30 is preferably formed from a relatively rigid material such as plastic, and may advantageously be manufactured by injection molding. The term "relatively rigid" is defined as meaning that the frame 30 is able to flex or deflect as necessary to allow element 40 to be assembled with it, yet the frame retains its desired shape and supports the insert during handling, throughout the blow-molding process (to be described below), and during use in the vehicle.

Frame 30 comprises a plurality of perimeter segments 32 and one or more inner segments 34a, 34b. A plurality of small tabs 36 extend inwardly from perimeter frame segments 32. First and second retention fingers 38a, 38b extend outwardly from perimeter frame segments 32 in opposite circumferential directions. A rib 34c is formed integrally with and extends along the length of inner frame segment 34b.

HCA element 40 may comprise one or more layers of polymeric sheets that are impregnated with a HC vapor adsorption/desorption material. The polymeric material may, for example, be non-woven polyester and the HC vapor adsorption/desorption material may be activated carbon, in some examples. Additionally, or alternatively, the HC vapor adsorption/desorption material may include carbon, activated carbon, zeolites, silicon oils, cyclodextrins, and/or any other suitable adsorption/desorption material as known in the art.

HCA element 40 may be manufactured by a thermoforming process wherein one or more polymeric sheets are placed in a forming die (not shown) and subjected to heat and pressure. In the disclosed embodiment, surface features that aid in retaining HCA element 40 in connection with frame 30 are formed in/on HCA element 40 by the forming die during the thermo-forming process. Such surface features may include depressions 42 along the perimeter edges of the element and elongated channels 44a, 44b extending along its inner/concave surface. These features cooperate with mating features of frame 30 to secure the two components together.

HC trap insert 20 is assembled by snapping HCA element 40 into frame 30 so that tabs 36 engage the respective depressions 42, and inner frame segments 34a, 34b engage the respective channels 44a, 44b. The engagement between the mating features serves to properly position and securely hold the element 40 to the frame 30. Any other appropriate means/method of attaching HCA element 40 to frame 30 may be used. Such methods include welding, adhesives, and heat-staking.

Frame 30 and HCA element 40 are curved to match the curvature of the inner surface of the shell 12. When HC trap insert 20 is operatively positioned inside shell 12, HCA element 40 follows the contours of the adjacent portions of the shell interior and a maximum amount of the surface area of the element 40 is exposed to vapors and intake air present in the duct 10. Shell 12 is molded over the assembled HC trap insert 20 so that the plastic material of the shell wraps around the convex outer surface of the HC trap insert and contacts perimeter frame segments 32 and retention fingers 38a, 38b thereby retaining the HC trap insert securely within the shell after the plastic material cools and hardens.

The dimensions and shape of an HC trap insert designed for use in a particular air duct will be tailored to that specific application and depend upon design requirement such as: the required adsorption capacity of the HCA element 40; the size, shape, and location of the duct 10; and other packaging constraints. In the depicted embodiment, HC trap insert 20 extends around approximately half of the circumference of the interior (as best seen in FIG. 3) and along approximately half of the overall axial length of duct 10, but this configuration is exemplary only. A duct according to the present invention may have a molded-in HC trap insert that occupies the entire interior surface of the shell, or any portion thereof.

Air intake duct 10 may advantageously be manufactured by a blow-molding process in which shell 12 is molded around/over HC trap insert 20. FIG. 9 shows HC trap insert 20 positioned in registry with a blow-molding core 60. Core 60 may be slightly tapered along its length (the vertical dimension as oriented in FIG. 9) so that HC trap insert 20 slides downwardly over the core 60 for positive positioning thereon. The taper also enables easy removal of the completed duct 10 from the mold when complete. Correct alignment of HC trap insert 20 relative to core 60 is ensured by engagement between rib 34c and an axial groove 62 in the surface of the core as the insert slides down over the core. Core 60 may include one or more interior passages 64 through which positive pressure is applied during the blow-molding process, as is known in the art.

In the embodiment of an air intake duct depicted herein, design requirements have resulted in HCA adsorbing element 40 being of such a size and configuration that it extends or wraps around somewhat less than one-half of the inner circumference of shell 12, as best seen in FIG. 3. Retention fingers 38a, 38b extend from the frame perimeter 32 in opposite circumferential directions to increase the overall size of HC trap insert 20 such that the insert wraps around more than one-half of the circumference of duct 10 and core 60. By providing this "wrap-around" geometry of HC trap insert 20, retention fingers 38a, 38b retain the HC trap insert in proper registry with core 60 when the insert is placed over the core, as shown in FIG. 9.

Retention fingers 38a, 38b also increase the area of frame 30 that is contacted by shell 12 during the molding process, as best seen in FIGS. 1-5. The increased contact area provides for more secure engagement between the trap element 20 and the shell 12.

Figure 11:
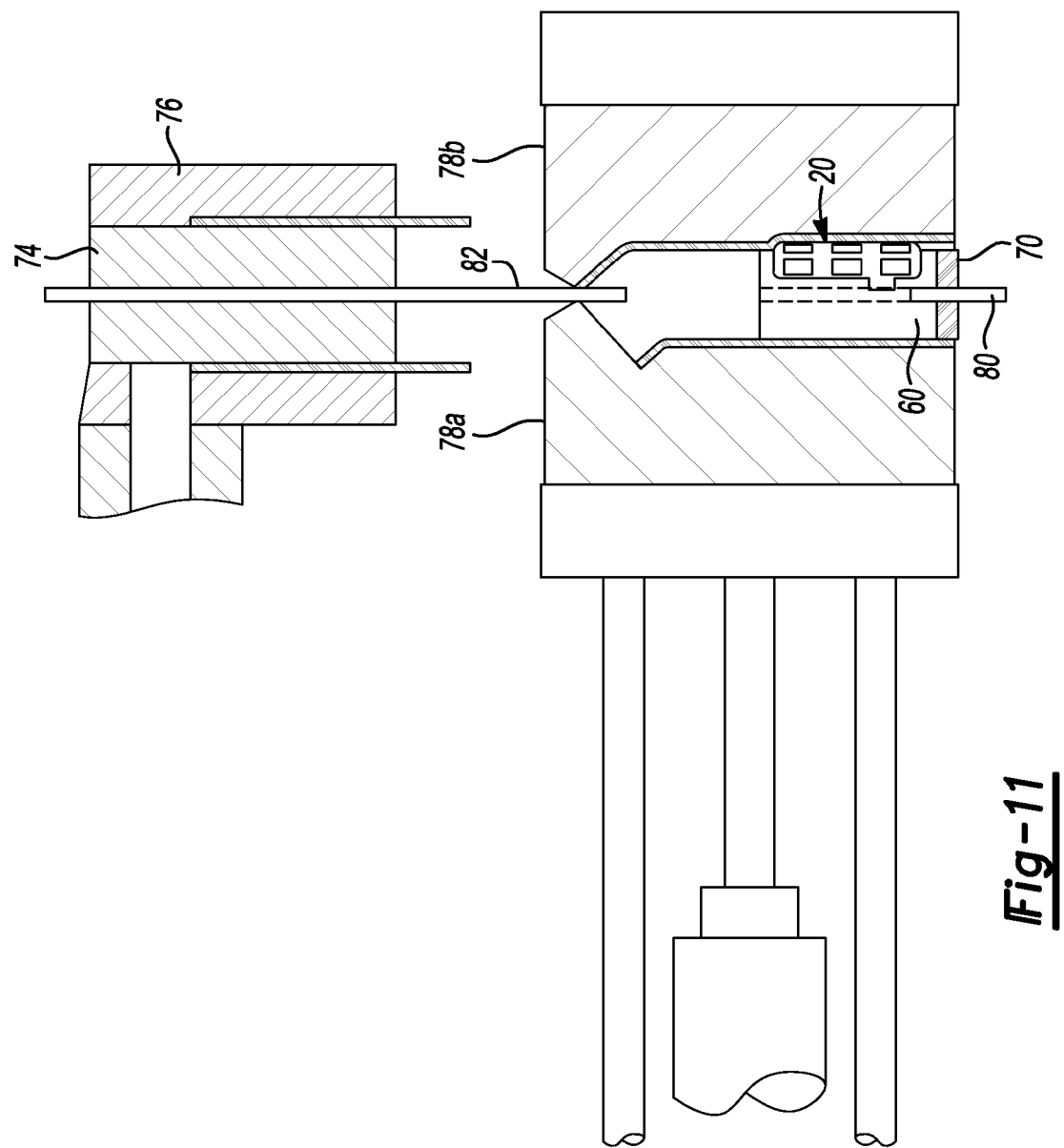
FIG. 11 is a schematic view of the blow molding apparatus of FIG. 10 with the mold halves closed.

FIGS. 10 and 11 are simplified schematic depictions of a blow-molding apparatus. In FIG. 10, core 60 is secured to the top of a holding fixture 70 and HC trap insert 20 is positioned in registry with the core in preparation for blow-molding. In the blow-molding process, as is well known in the art, a parison 72 of molten plastic is extruded from a mandrel 74 and die head 76. The tubular parison 72 descends (under gravity) downward between the mold halves 78a, 78b and surrounds the core 60. The mold halves 78a, 78b are then closed (as seen in FIG. 11), forming the molten parison over the HC trap insert 20 and core 60. Air (or other gas) is then injected under pressure into the mold through blow pins 80, 82 to urge the still-soft plastic of the parison outwardly against the inner surfaces of the mold dies above core 60.

Upon cooling, parison 72 forms the shell 12, which is now coupled with HC trap insert 20 to form the duct 10.

Molding the shell 12 in one piece around HC trap insert 20 as described above enables the practical and economical production of air intake ducts with an integrated HCA element of a wide range of possible sizes, shapes, and locations within the duct. The trap is retained securely within the duct 10 regardless of the shape. No additional fasteners, machining, or assembly steps are required.

To achieve good results in the blow-molding process described herein, it has been found that having the relatively flexible HCA element 40 supported by the relatively rigid frame 30 provides unique advantages. The relatively rigid frame 30 also allows secure and consistent placement of the insert 20 in proper registry with the core during the production process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   securing a hydrocarbon-adsorbing element to a frame by placing a tab of the frame in engagement with a depression in the element;
   positioning the frame in registry with a core;
   placing a molten plastic parison and mold around the frame and core; and
   blow-molding the parison to form a shell engaging and retaining the frame with a surface of the insert element exposed to a hollow interior of the shell.

2. The method of claim 1 wherein the step of positioning the frame in registry with the core comprises placing the frame over and in contact with the core.

3. The method of claim 2 wherein the frame comprises at least one positioning feature and the step of placing the frame in contact with the core comprises placing the positioning feature in engagement with a complementary feature of the core.

4. The method of claim 3 wherein the positioning feature comprises a rib and the complementary feature comprises a groove.

5. The method of claim 1 wherein the frame wraps around more than half of a circumference of the core to hold the frame in registry with the core.

6. The method of claim 1 wherein the hydrocarbon-adsorbing element is formed by thermoforming at least one sheet of polymeric material, at least a portion of the sheet impregnated with a hydrocarbon vapor adsorption/desorption material.

7. The method of claim 6 wherein the depression is formed in a surface of the hydrocarbon-adsorbing element during the thermoforming.

\* \* \* \* \*